United States Patent
Valles Casanova et al.

(10) Patent No.: US 10,625,523 B2
(45) Date of Patent: Apr. 21, 2020

(54) BRAKING SYSTEM

(71) Applicant: Hewlett-Packard Development Company, L.P., Houston, TX (US)

(72) Inventors: Luis Valles Casanova, Sant Cugat del Valles (ES); Jerry Claesson, Sant Cugat del Valles (ES); Niels Sanchez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/074,734

(22) PCT Filed: May 27, 2016

(86) PCT No.: PCT/EP2016/062094
§ 371 (c)(1),
(2) Date: Aug. 1, 2018

(87) PCT Pub. No.: WO2017/202476
PCT Pub. Date: Nov. 30, 2017

(65) Prior Publication Data
US 2019/0061385 A1 Feb. 28, 2019

(51) Int. Cl.
*B41J 11/58* (2006.01)
*F16H 35/06* (2006.01)
(Continued)

(52) U.S. Cl.
CPC .............. *B41J 11/58* (2013.01); *B41F 13/016* (2013.01); *B41J 33/52* (2013.01); *B65H 23/06* (2013.01);
(Continued)

(58) Field of Classification Search
CPC ......... B41J 11/58; B41J 33/53; F16H 19/001; F16H 19/003; F16H 19/005;
(Continued)

(56) References Cited

U.S. PATENT DOCUMENTS

| 4,618,039 A | 10/1986 | Omata |
|---|---|---|
| 5,221,149 A | 6/1993 | Takekoshi et al. |

(Continued)

FOREIGN PATENT DOCUMENTS

| CN | 103465645 | 12/2013 |
|---|---|---|
| EP | 1371873 | 12/2003 |

(Continued)

OTHER PUBLICATIONS

Unknown. Practix Manufacturing USA: Sublimation Transfer Press That is Fast and Affordable, Feb. 15, 2015, 2 pages.

*Primary Examiner* — Juanita D Jackson
(74) *Attorney, Agent, or Firm* — HP Inc. Patent Department

(57) ABSTRACT

An example braking system is described including a support structure which is pivotable about a first axis and a braking mechanism including a gear engagement mechanism which is fixed with respect to the first axis. The gear engagement mechanism may have a first and a second toothed portion, a first gear wheel rotatable about a second axis, and a second gear wheel rotatable about a third axis. The first gear may be connected to a first damping mechanism to damp pivoting of the support structure in a first direction when the first gear wheel is engaged with the first toothed portion. The second gear wheel may be connected to a second damping mechanism to damp pivoting of the support structure in a second direction when the second gear wheel is engaged with the second toothed portion. A print target holder system and a printer system are also described.

15 Claims, 9 Drawing Sheets

(51) Int. Cl.
 *F16H 19/00* (2006.01)
 *B41F 13/016* (2006.01)
 *B41J 33/52* (2006.01)
 *B65H 23/06* (2006.01)
 *B41J 19/02* (2006.01)
 *F16H 1/02* (2006.01)

(52) U.S. Cl.
 CPC ........... *F16H 19/001* (2013.01); *F16H 35/06* (2013.01); *B41J 19/02* (2013.01); *B65H 2403/421* (2013.01); *F16H 1/02* (2013.01)

(58) Field of Classification Search
 CPC ...... F16H 19/006; F16H 19/008; F16H 19/02; F16H 1/02; F16H 2019/008; F16H 35/06; B41F 13/016; B65H 23/06
 See application file for complete search history.

(56) References Cited

U.S. PATENT DOCUMENTS

| | | |
|---|---|---|
| 7,357,388 B2 | 4/2008 | Dan |
| 8,918,021 B2 | 12/2014 | Oomoto et al. |
| 2007/0052789 A1* | 3/2007 | Asada ........................... 347/222 |
| 2011/0072925 A1* | 3/2011 | Ikeda .................... F16H 19/001 |
| 2015/0041469 A1 | 2/2015 | Fukumoto |
| 2016/0018780 A1 | 1/2016 | Sugiyama et al. |

FOREIGN PATENT DOCUMENTS

| | | |
|---|---|---|
| JP | 2004168552 A | 6/2004 |
| JP | 2007161366 A | 6/2007 |
| WO | WO-2008117779 A1 | 10/2008 |

* cited by examiner

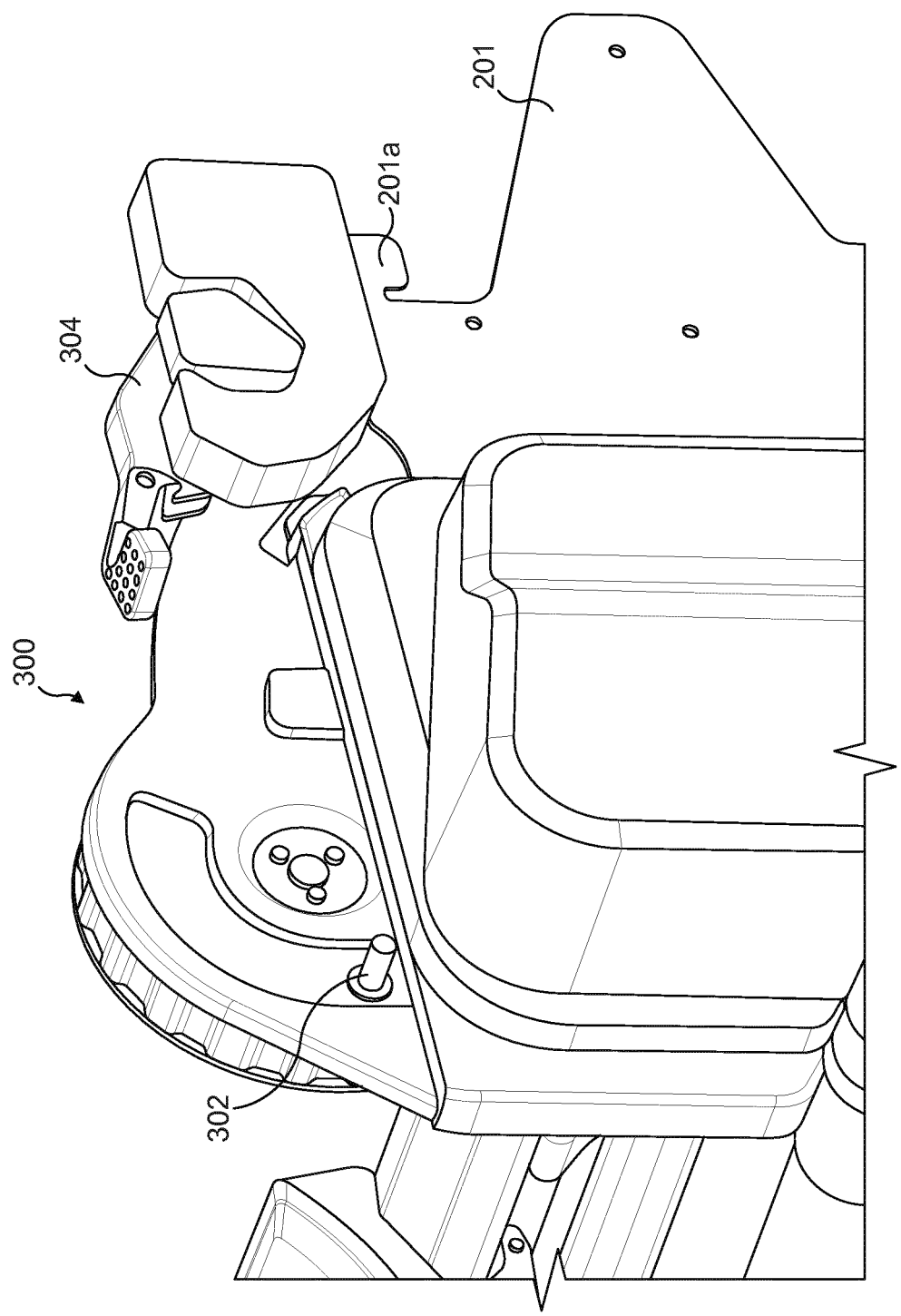

BRAKING SYSTEM

BACKGROUND

In many printing devices, components of the printing device may transition between different configurations. Damping or braking systems may be used to control the transition. For example, rotational dampers may be used, with or without a directional clutch.

BRIEF DESCRIPTION OF THE DRAWINGS

FIG. 3a is a perspective diagram of a lever mechanism for holding the braking system in the first configuration;

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Figure 1A:
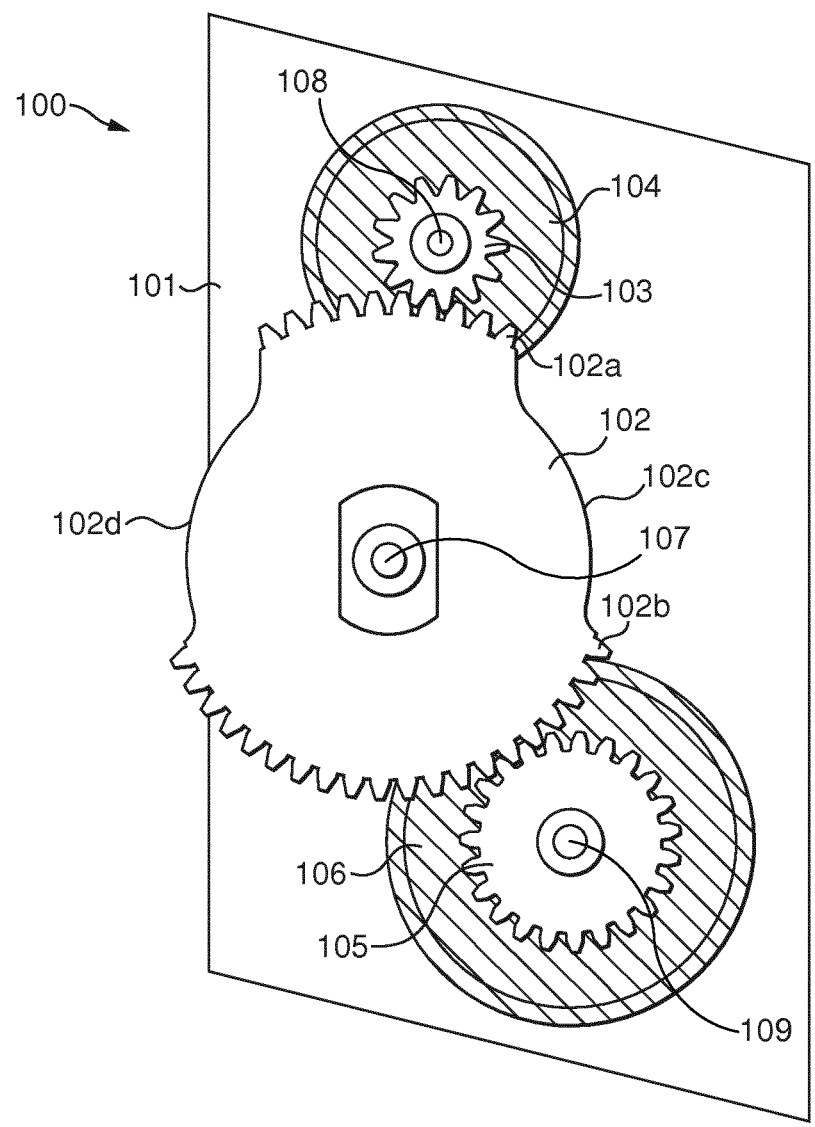
FIG. 1a is a schematic diagram of a braking system according to an example.
Figure 1B:
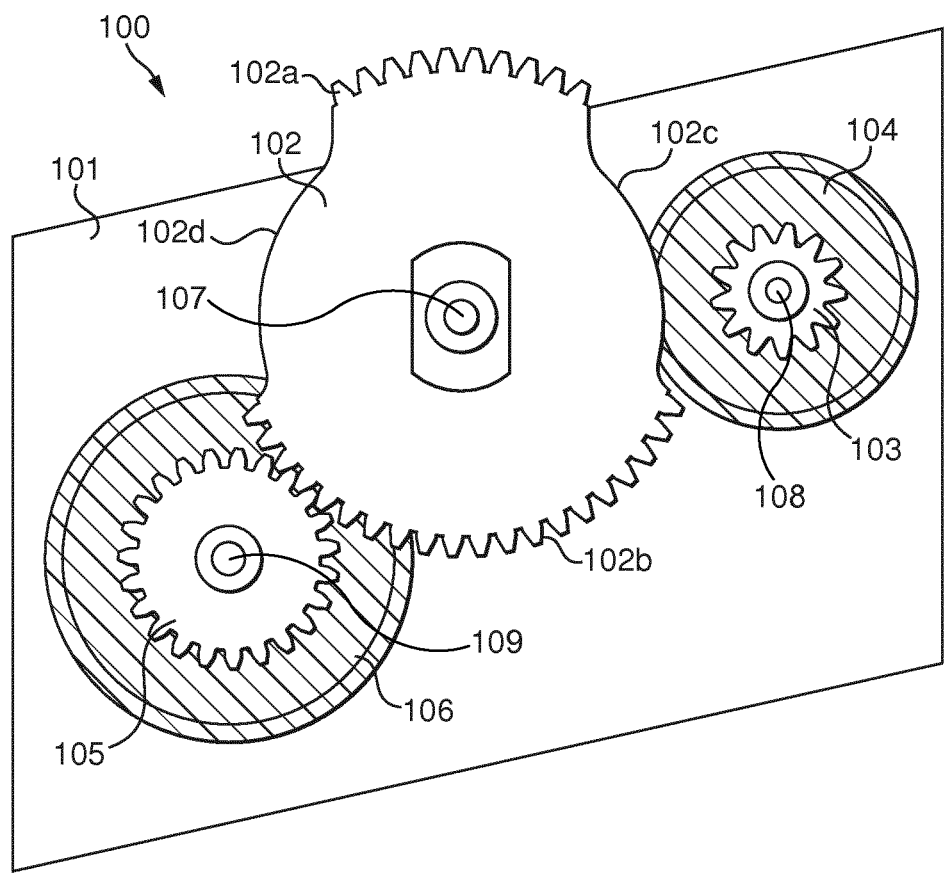
FIG. 1b is a schematic diagram of the braking system of FIG. 1a in a second configuration.

FIGS. 1a and 1b schematically illustrate an example braking system 100 for a 2D or 3D printer. The example braking system 100 comprises a support structure 101, which may be a metal plate, for example. The example braking system 100 also comprises a gear engagement mechanism 102, a first gear mechanism, in the form of a first gear wheel 103, and a second gear mechanism, in the form of a second gear wheel 105. The first gear wheel 103 is connected to a first damping mechanism 104, and the second gear wheel 105 is connected to a second damping mechanism 106. The gear engagement mechanism may be a fixed gear piece 102 comprising first and second engagement portions, in the form of a first toothed portion 102a and a second toothed portion 102b, respectively. In the example of FIGS. 1a and 1b, the gear piece comprises a first toothless portion 102c and a second toothless portion 102d, along the circumference of the gear piece 102.

In this example, the support structure 101 is pivotable (rotatable), about a first axis 107 fixed with respect to the gear piece 102, so that the support structure 101 pivots (rotates) relative to the gear piece 102. The first axis 107 may be an axis of rotation that passes through of the gear piece 102 and is substantially perpendicular to both the surface of the support structure 101 and the surface of the gear piece 102.

The first gear wheel 103 and second gear wheel 105 are each mounted on the support structure 101. That is, the gear wheels 103, 105 are connected to the support structure 101 so that they rotate concurrently with the support structure 101 when the support structure 101 rotates around the first axis 107 of rotation. The gear wheels 103 may be rotatable relative to support structure 101 about, respectively a second axis 108 of rotation and a third axis 109 of rotation. The second and third axes 108, 109, may be substantially parallel to the first axis 107. Each of the axes 106, 107, 108 may be defined by, for example, a rotational shaft about which the respective components rotate.

In the example of FIGS. 1a and 1b, the first gear wheel 103 is toothed to engage with the first toothed portion 102a of the gear piece 102. In other words, the first gear mechanism (the gear wheel 103) selectively engages with the gear engagement mechanism by engaging with the toothed portion 102a. As mentioned above, the first gear wheel 103 is connected to the first damping mechanism. The first damping mechanism (braking mechanism) may be a damper 104 mounted on to the support structure 101 such that it lies between the support structure 101 and the gear wheel 103. For example, the damper 104 may be connected to the gear wheel 103 via a shaft that passes through the centre of the damper 104 and the gear wheel 103.

The damper 104 may be a one-directional damper such that it allows free (undamped) rotation of the gear wheel 103 in one direction, and provides a damping (braking) force against rotation when the gear wheel 103 rotates in the opposite direction.

In the example of FIGS. 1a and 1b, the second gear wheel 105 is toothed to engage with the second toothed portion 102b of the gear piece 102. In other words, the second gear mechanism (the gear wheel 105) selectively engages with the gear engagement mechanism by engaging with the toothed portion 102b. As mentioned above, the second gear wheel 105 is connected to a second damping mechanism 106. The second damping mechanism (braking mechanism) may be a damper 106 mounted on to the support structure 101 so that it lies between the support structure 101 and the second gear wheel 105. For example, the second gear wheel 105 may be connected to the damper 106 via a shaft that passes through the centre of the damper 106 and the second gear wheel 105.

The second damper 106 may also be a one-directional damper. In other words, it may allow the gear wheel 105 to rotate freely in one direction, and provide a damping (braking) force against rotation of the gear wheel 105 in the opposite direction.

Since the support structure 101 rotates relative to the gear piece 102, the gear wheels 103, 105 move with the support structure 101 as it rotates i.e. the gear wheels 103, 105 rotate about the first axis 107 concurrently with the support structure 101. Furthermore, the gear wheels 103, 105 rotate about their respective axes 108, 109 of rotation in the same direction of rotation as, and concurrently with, the rotation of the support structure 101, when the gear wheels 103, 105 are engaged with the toothed portions 102a, 102b.

In the example of FIGS. 1a and 1b, the first damper 104 damps the rotation of the gear wheel 103 about the second axis 108, and therefore the pivoting of the support structure 101 due to the concurrent pivoting (rotating) of the gear wheel 103 about the axis 108 and the rotating of the support structure 101 about the first axis 107, in a first direction when the first gear wheel 103 is engaged with the first toothed portion 102a. Conversely, the second damper 106 damps the rotation of the gear wheel 105 about the third axis 109, and therefore the pivoting of the support structure 101 due to the concurrent pivoting (rotating) of the gear wheel 105 about the axis 109 and the rotating of the support structure 101 about the first axis 107, in a second direction when the second gear wheel 105 is engaged with the second toothed portion 102b.

FIG. 1a illustrates an example of a first configuration of the braking system 100, and FIG. 1b illustrates an example of a second configuration of the braking system 100. In the first configuration, the first gear wheel 103 is engaged with the first toothed portion 102a, and the second gear wheel 105 is engaged with the second toothed portion 102b. On the other hand, in the second configuration, the first gear wheel 103 is disengaged from the first toothed portion 102a (i.e. it is adjacent the first toothless portion 102c), and the second gear wheel 105 is engaged with the second toothed portion 102b.

In this example, the support structure 101 pivots (rotates) in a clockwise direction to transition from the first configuration to the second configuration, and pivots (rotates) in a counter-clockwise direction to transition from the second configuration to the first configuration. The transition of the braking system 101 from the first configuration to the second configuration, that is, from the configuration of FIG. 1a to the configuration of FIG. 1b, will first be described. In this example, as the support structure 101 begins to rotate in a clockwise direction from the first configuration, the first gear wheel 103 rolls along the first toothed portion 102a of the gear piece 102 as the teeth of the gear wheel 103 interlock with the teeth of the toothed portion 102a. Concurrently, the second gear wheel 105 similarly traverses along the second toothed portion 102b of the gear piece 102 in a rolling fashion as the teeth of the gear wheel 105 interlock with the teeth of the toothed portion 102b. It will be understood that with the clockwise rotation of the support structure 101 relative to the gear piece 102, both gear wheels 103 and 105 rotate in a clockwise direction about, respectively, the second 108 and third 109 axes of rotation.

In this example, the one-directional damper 104 connected to the first gear wheel 103 provides a damping (braking) force against rotation when the gear wheel 103 rotates in the counter-clockwise direction, and substantially no damping (braking) force when the gear wheel 103 rotates in the clockwise direction. Therefore, the damper 104 does not inhibit the clockwise rotation of the gear wheel 103.

On the other hand, in this example, the one directional damper 106 connected to the second gear wheel 105 provides a damping (braking) force against rotation when the gear wheel 105 rotates in the clockwise direction, and substantially no damping (braking) force when the gear wheel 105 rotates in the counter-clockwise direction. The damping (braking) force against the clockwise rotation of the second gear wheel 105 damps the pivoting (rotating) of the support structure 101 in the clockwise direction because, in this example, when the support structure 101 rotates in a clockwise direction, the gear wheel 105 also concurrently rotates in the clockwise direction as long as the gear wheel 105 is engaged with the second toothed portion 102b. In other words, in this example, a damping (braking) force against the clockwise rotation of the gear wheel 105 results in a damping (braking) force against the clockwise rotation of the support structure 101 when the gear wheel 105 is engaged with the second toothed portion 102b. Therefore, the damper 106 damps the pivoting (rotating) of the support structure 101 in the clockwise direction.

In this example, the first toothed portion 102a covers a smaller part of the circumference of the gear piece 102 than the second toothed portion 102b covers. Therefore, as the support structure 101 rotates in a clockwise direction relative to the gear piece 102, the first gear wheel 103 disengages from the first toothed portion 102a while the second gear wheel 105 remains engaged with the second toothed portion 102b. In this example, the portions of the circumference around which the toothed portions 102a, 102b extend are chosen such that in the configuration of FIG. 1b (the second configuration), the second gear wheel 105 is still engaged with the toothed portion 102b, but the first gear wheel 103 is not engaged with either of the toothed portions 102a, 102b of the gear piece 102. Therefore, in this example, because the gear wheel 105 remains engaged with the second toothed portion 102b for the entire clockwise rotation of the support structure 101 from the first configuration to the second configuration, the damper 106 damps the pivoting (rotating) of the support structure 101 for the entirety of this pivoting (rotating) motion.

The portion of the circumference of the gear piece 102 around which the first toothed portion 102a extends may be varied depending on the point of the pivoting motion of the support structure 101 at which the gear wheel 103 is desired to be disengaged from the first toothed portion 102a. The transition of the braking system 101 from the second configuration to the first configuration, that is, from the configuration of FIG. 1b to the configuration of FIG. 1a, will now be described. In this example, as the support structure 101 begins to rotate in a counter-clockwise direction about the first axis 107 from the second configuration to the first configuration, the second gear wheel 105 rolls along the second toothed portion 102b of the gear piece 102 as the teeth of the gear wheel 105 interlock with the teeth of the toothed portion 102b. In this example, the gear wheel 105 rotates in a counter-clockwise direction about the third axes 109 of rotation with the counter-clockwise rotation of the support structure 101 as the gear wheel 105 rolls along the second toothed portion 102b. On the other hand, since initially the first gear wheel 103 is not engaged with a toothed portion of the gear piece 102, the first gear wheel 103 does not rotate with the counter-clockwise rotation of the support structure 101.

Further in this example, the damper 106 to which the second gear wheel 105 is connected provides substantially no damping (braking) force when the gear wheel 105 rotates in the counter-clockwise direction. Therefore, the damper 106 does not inhibit the counter-clockwise rotation of the support structure 101.

As the support structure 101 continues to rotate counter-clockwise relative to the gear piece 102, the first gear wheel 103 engages with the first toothed portion 102a. Thereafter, the gear wheel 103 rotates in a counter-clockwise direction about the second axis 108 of rotation as it rolls along the first toothed portion 102a of the gear piece 102 as the teeth of the gear wheel 103 interlock with the teeth of the toothed portion 102a. The one directional damper 104 connected to the first gear wheel 103 provides a damping (braking) force against rotation when the gear wheel 103 rotates in the counter-clockwise direction. The damping (braking) force against the counter-clockwise rotation of the first gear wheel 103 damps the pivoting (rotating) of the support structure 101 in the counter-clockwise direction in the same way as described above for the clockwise rotation of the support structure 101. Therefore, the damper 104 damps the pivoting (rotating) of the support structure 101 in the counter-clockwise direction when the first gear wheel 103 is engaged with the first toothed portion 102a.

It will be understood that, in this example, a damping (braking) force inhibiting the pivoting motion of the support structure 101 when it transitions from the configuration of FIG. 1b (second configuration) to the configuration of FIG. 1a (first configuration) is generated during the latter part of the pivoting motion towards the first configuration, since this is the part of the pivoting motion during which the first gear wheel 103 is engaged with and rolls along the first toothed portion 102a. In other examples, a braking force may be provided for a different part of the pivoting motion of the support structure 101.

It will be understood from the above description that, in this example, both gear wheels 103, 105 rotate in the same direction about their respective axes 108, 109 of rotation for a given direction of rotation of the support structure 101, but that their respective dampers 104, 106 provide a braking force in the opposite directions. This results in one of the dampers providing a braking force to inhibit the pivoting motion of the support structure 101 in a given direction. However, in some examples either or both of the dampers 104, 106 provide a braking force in both directions. The dampers 104, 106 may be selected according to a desired magnitude of braking force.

The amount of braking force generated for a given amount of rotation of the support structure 101 relative to the gear piece 102, in this example, also depends on the size of the gear wheels 103, 105 used. As it will be understood, the larger a gear wheel's diameter, the smaller the amount by which it will rotate for a given length of the toothed portion of the gear piece 102 traversed in a rolling fashion i.e. the smaller the gear ratio between the gear piece 102 and gear wheel 102, 103. The gear ratio between the gear wheel 103 and the toothed portion 102a may be selected to be different to the gear ratio between the gear wheel 105 and the toothed portion 102b, according to relative desired braking forces, for example.

The braking system 100 may therefore allow different braking forces in different directions of rotation of the support structure 101 relative to the gear piece 102. The braking system 100 may also allow a braking force for a given portion of the rotation of the support structure 101 relative to the gear piece 102 depending on the position and length along the circumference of the toothed portions 102a and 102b, and the positions of the gear wheels 103 and 105 relative to the toothed portions of the gear piece 102.

Figure 2A:
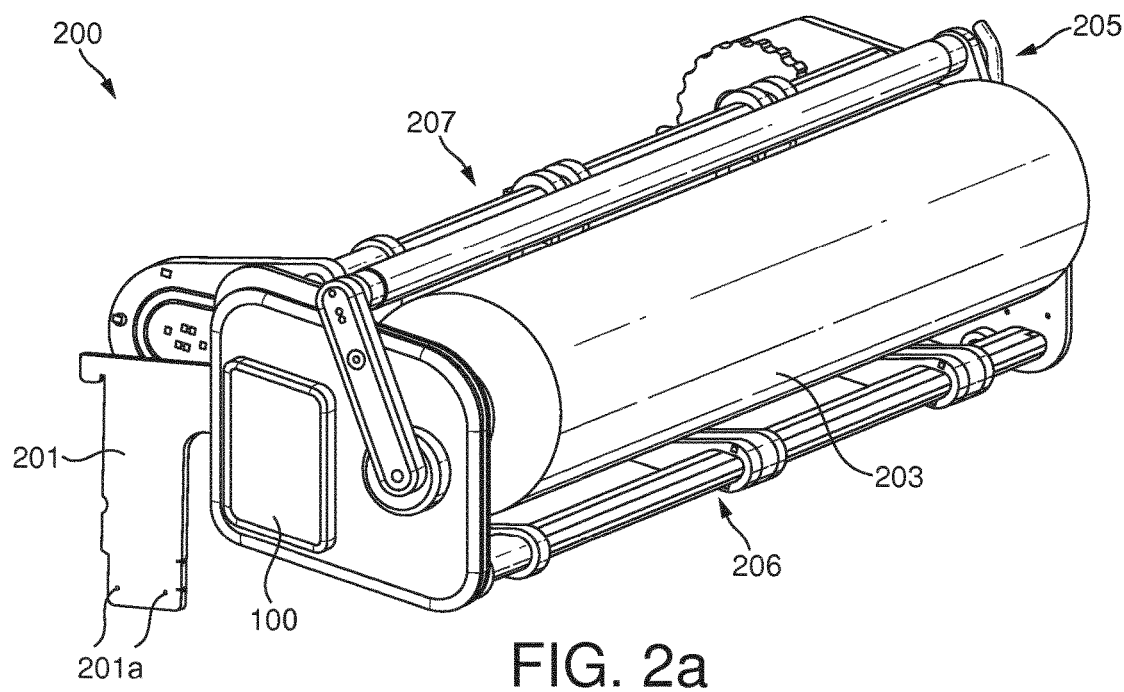
FIG. 2a is a perspective view of a print target holder system according to an example.
Figure 2B:
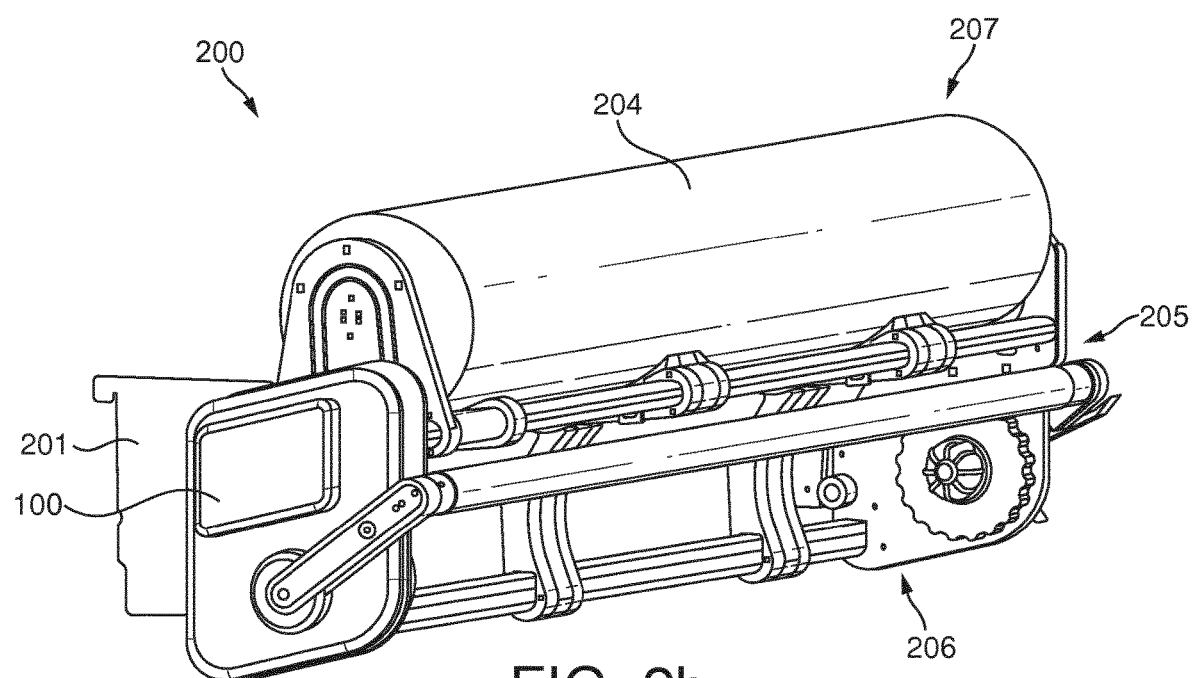
FIG. 2b is a perspective view of the print target holder system of FIG. 2a in a second configuration.

FIGS. 2a and 2b illustrate an example print target holder system 200 (hereinafter "holder system") on which the braking system 100 is mounted. In this example, a braking system 100 is mounted on one side of the holder system 200; however, in some examples, braking systems 100 are mounted on both sides of the holder system. The example holder system 200 comprises a connection mechanism 201 to connect the holder 200 to a printer. The connection mechanism 201 may be a physical structure, such as a frame, that allows the holder system 200 to be mounted onto a printer. The connection mechanism 201 may be a part of the holder structure 205. The connection mechanism 201 may include holes 201a, which may be used to fix the holder system to the printer using screws, for example. The holder system 200 also comprises a print target holder structure 205 (hereinafter holder structure) rotatably (pivotably) connected to the connection mechanism 201 so that it may rotate relative to the connection mechanism 201. The support structure 101 of the braking system 100 is fixedly connected to the holder structure 205 as shown in FIGS. 2a and 2b, and may therefore rotate relative to the connection mechanism 201 concurrently with the holder structure 205. More specifically, the support structure 101 is fixedly connected to the holder structure 205. The gear piece 102 in this example, is fixed with respect to the connection mechanism 201 such that the first and second engagement portions 102a, 102b are fixed with respect to the connection mechanism 201. In other words, the holder structure 205 and the support structure 101 of the braking system 100 rotate concurrently with respect to the gear piece 102. In this example, the holder structure 205 comprises first and second print target holders 206, 207 to hold respective print target rolls 203, 204. The first and second print target holders 206, 207 each pivot concurrently with the holder structure 205. The target rolls 203, 204 may be rolls of printing media, which printing media may be media such as paper, card, textiles, or any other type of medium.

The holder structure 205 may pivot between a first configuration and a second configuration. In this example, the holder structure 205 pivots (rotates) about the first axis 107 of rotation. The first configuration to which the holder structure 205 pivots (rotates) in this example, is illustrated in FIG. 2a. The first configuration of the holder structure 205 corresponds to the first configuration of the support structure 101 of the braking system 100 which rotates concurrently with the holder structure 205. In this example, in the first configuration of the holder structure 205, the holders 206, 207 are held substantially horizontally aligned. That is, the holders 206 and 207 of the holder structure 205 are substantially in the same horizontal plane.

In this example, the second configuration is the configuration of the holder structure 205 illustrated in FIG. 2b. The second configuration of the holder structure 205 corresponds to the second configuration of the support structure 101 of the braking system 100 which rotates concurrently with the holder structure 205. The second configuration, that is the configuration of FIG. 2b, in this example, is one in which the holders 206 and 207 are substantially vertically aligned. That is, in the second configuration, the holders 206 and 207 are in the same vertical plane.

The braking system 100 fixedly connected to the holder structure 205 functions to damp (inhibit) the pivoting (rotating) motion of the holder structure 205 as described above. When the holder structure 205 pivots (rotates) in a clockwise direction from the first configuration to the second configuration, the support structure 101 concurrently rotates in a clockwise direction. During this rotation, as described above, the damper 106 damps the pivoting of the supports structure 101. Since the support structure is fixedly connected to the holder structure 205, the second damper 106 provides a braking force to inhibit the clockwise rotation of the holder structure 205. That is, the damper 106 provides a braking force to inhibit movement of the holder structure 205 towards the second configuration. As described above, the damper 106 provides a braking force against this clockwise rotation for the entirety of this rotation in this example.

When the holder structure 205 pivots (rotates) in a counter-clockwise direction from the second configuration to the first configuration, the support structure 101 concurrently rotates in a counter-clockwise direction. During this rotation, as described above, the damper 104 damps the pivoting of the supports structure 101 for the later part of this counter-clockwise rotation in this example. Since the support structure is fixedly connected to the holder structure 205, the damper 104 provides a braking force to inhibit the counter-clockwise rotation of the holder structure 205 for the later part of the counter-clockwise rotation. That is, the damper 104 provides a braking force to inhibit movement of the holder structure 205 towards the first configuration. As described above, the damper 104 provides a braking force against this counter-clockwise rotation for the later part of this rotation in this example.

Figure 3B:
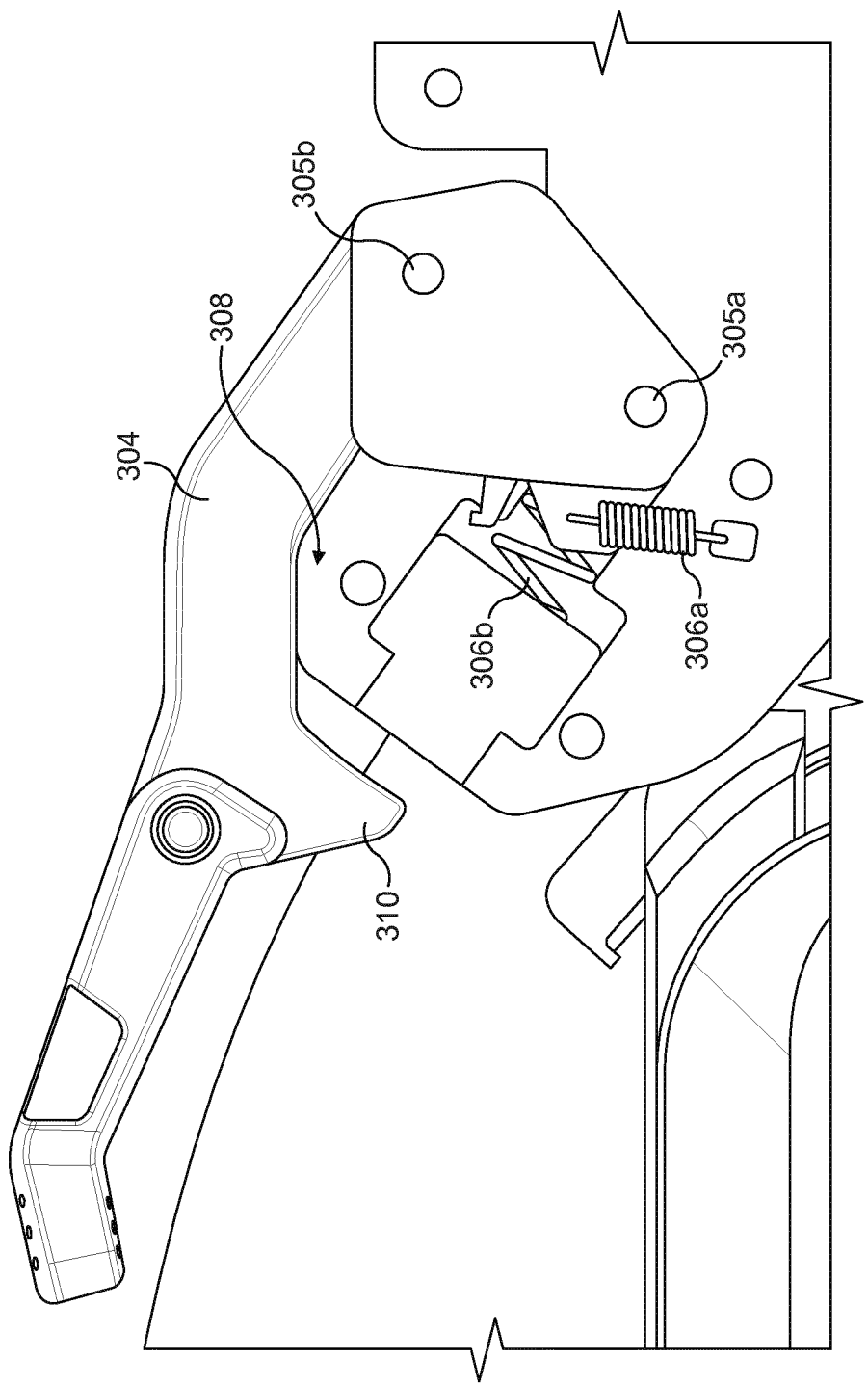
FIG. 3b is schematic diagram of the fixing mechanism of FIG. 3a viewed from the side.

In some examples, one or both of the first and second configurations of the holder system 200 are stable configurations, in which the holder system 200 is held in a stable respective position. FIGS. 3a and 3b illustrate an example of fixing mechanism 300 to fix the holder system 200 in the first configuration. In this example, the fixing mechanism 300 is a lever mechanism comprising a protruding part 302, herein referred to as a catch 302 on an end of the holder 207, and a lever 304 on the connection mechanism 201. In this example, the lever 304 is mounted on pivots 305a, 305b and attached to resilient members in the form of a first spring 306a and a second spring 306b. When moving the holder system 200 from the second configuration to the first configuration, the rotation/pivoting motion of the holder structure 205 causes catch 302 to engage with a protrusion 310 on the lever 304, forcing the lever 304 upwards, tensioning the springs 306a, 306b as it does so. As the holder structure 205 is rotated further, the catch 302 moves into a recess 308 of the lever, and the tension in the springs 306a, 306b biases the lever 304 downwards, thereby holding the catch 302 in place against the protrusion 310. In that example, the lever is in an engaged state (e.g., lowered). This enables the holder structure 205 to be fixed in place in the first configuration.

When moving the holder structure 205 from the first configuration to the second configuration, the lever 304 may be placed in a release state (e.g., raised), for example, by a human operator, and the catch 302 thereby released, enabling the holder structure 205 to be pivoted to the second configuration. Once the holder structure 205 has been pivoted to the second configuration, the weight of the holder structure 205 may keep the holder structure 205 stable in the second configuration, for example. The holder structure 205 thus pivots between the first configuration and the second configuration based on engagement of the lever mechanism 300.

In the example of FIGS. 2a and 2b, the target roll 203 may be an output target roll produced after a printing operation. Conversely, target roll 204 in this example, may be an input target roll from which the print target is consumed for printing. In this particular example, after a printing operation, the holder structure 205 is in the first configuration, which is the configuration of FIG. 2a, with the holder 207 empty, and the output target roll 203 is held in the holder 206 as shown in FIG. 2a.

The first configuration as shown in FIG. 2a may be adopted when the operator manipulates (for example, removes or replaces) the print target corresponding to the output roll 203. The second configuration as shown in FIG. 2b may be adopted when the operator manipulates (for example, removes or replaces) the print target corresponding to the input roll 204. This may enable manipulation of the print target corresponding to each roll 203, 204 at substantially the same height, which may alleviate the operator from having to adopt stressful postures when manipulating the print target, for example.

In other examples, after a printing operation, the holder structure may instead be in the second configuration (of FIG. 2b), the target roll 203 may instead be the input target roll, and the target roll 204 may instead be the output target roll.

Figure 4:
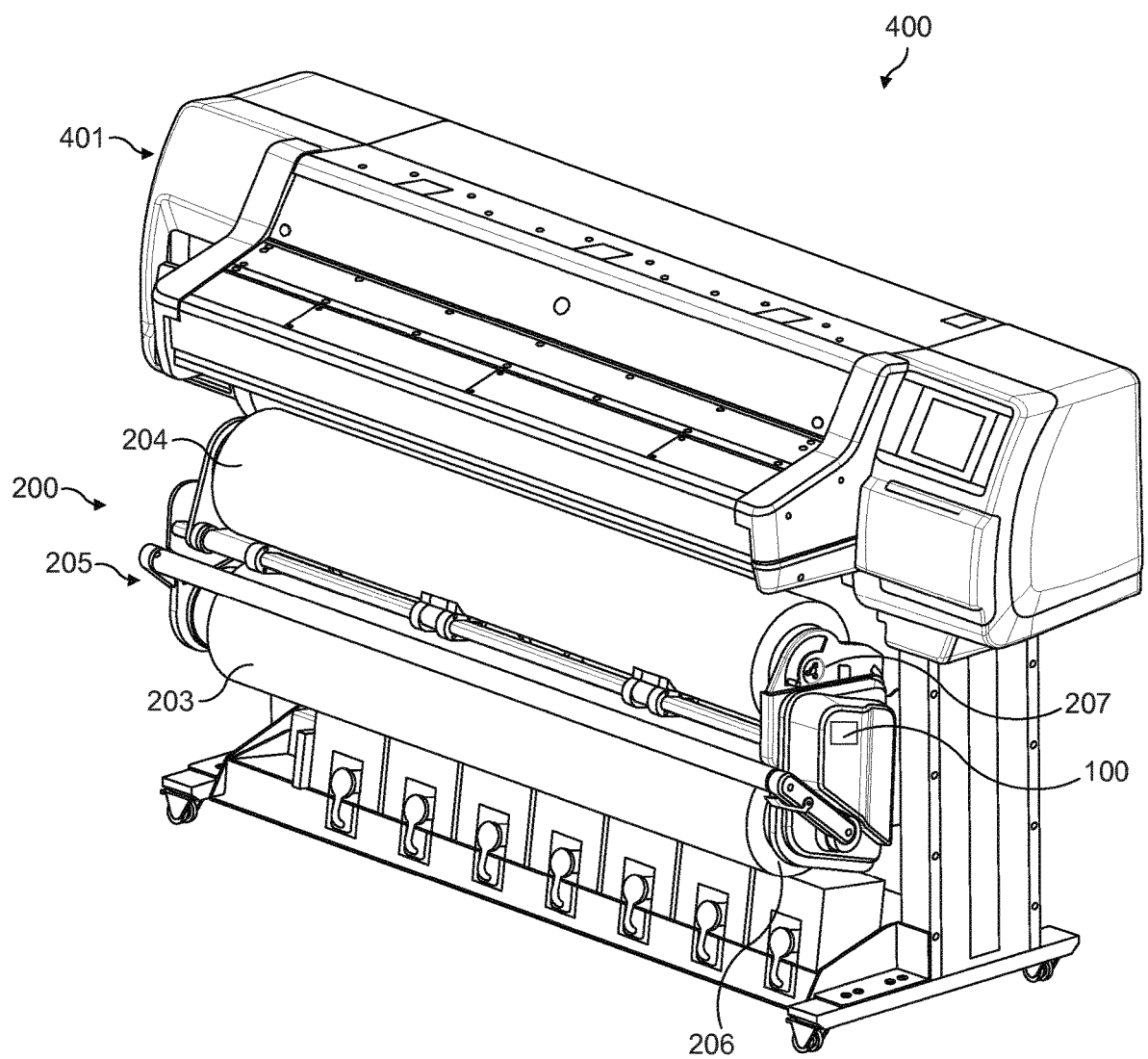
FIG. 4 is a perspective view of a printing device according to an example.

FIG. 4 illustrates a printing system 400 according to an example. The printing system 400 includes a printer 401, and the holder system 200, which is pivotably connected to the printer 401 using the connection mechanism 201. The holder system 200 the braking system 100 that functions as described above. In the example of FIG. 4, the holder structure 205 of the holder system 200 is shown in the second configuration (the configuration of FIG. 2b), with output and input target rolls 203 and 204 held in the holders 206 and 207 respectively. An operator, for example a human operator, may transition the holder structure 205 of the holder system 200 from the second configuration shown to the first configuration and vice versa.

For example, a human operator transitions the holder structure 205 from the second configuration to the first configuration. This may be done when an input target roll 204 is held in the holder 207, and the other holder 206 is empty. As described above, in this example, the damper 104 of the braking system 100 provides a braking force to inhibit the counter-clockwise pivoting motion of the holder structure 205 from the second configuration to the first configuration. In the above described example, this braking force is provided for the later part of the pivoting motion of the holder structure 205. Because substantially no braking force is provided during rotation of the holder structure 205 form the second configuration to the first configuration during the initial part of this rotation, the operator is relieved from having to overcome this braking force, in addition to the weight of the holder structure 205. However, when the holder structure 205 rotates to a position where the first gear wheel 103 engages with the first toothed portion 102a, the damper 104 provides a braking force to inhibit the pivoting motion towards the second configuration. In this example, the braking force is provided when the input target roll 204, under the influence of gravity, accelerates the holder structure 205 towards the first configuration. In this example, providing a braking force in the counter-clockwise direction for the later part of the pivoting motion of the holder structure 205 from the second configuration to the first configuration may, for example, inhibit components of the printing system 400 from crashing against each other, thereby preventing damage.

Conversely, in this example, the human operator initiates a transition from the first configuration to the second configuration. This may be done when the output target roll 203 is held in the holder 206, and the holder 207 is empty. In some examples, this may be the scenario after the printing device 400 completes a printing operation. As described above, the braking system 100 may provide a braking force to inhibit the pivoting motion, from the first configuration to the second configuration for the entire range of this pivoting motion of the holder structure 205. A braking force is therefore provided against the action of gravity on the output target roller 203 during the entirety of this transition in this example. This may, for example, inhibit crashing between components of the printing system 400 when the holder structure 205 arrives at the second configuration and/or it may alleviate the operator from having to support the entire weight of the holder structure 205 and print target during the transition from the first configuration to the second configuration.

Figure 5A:
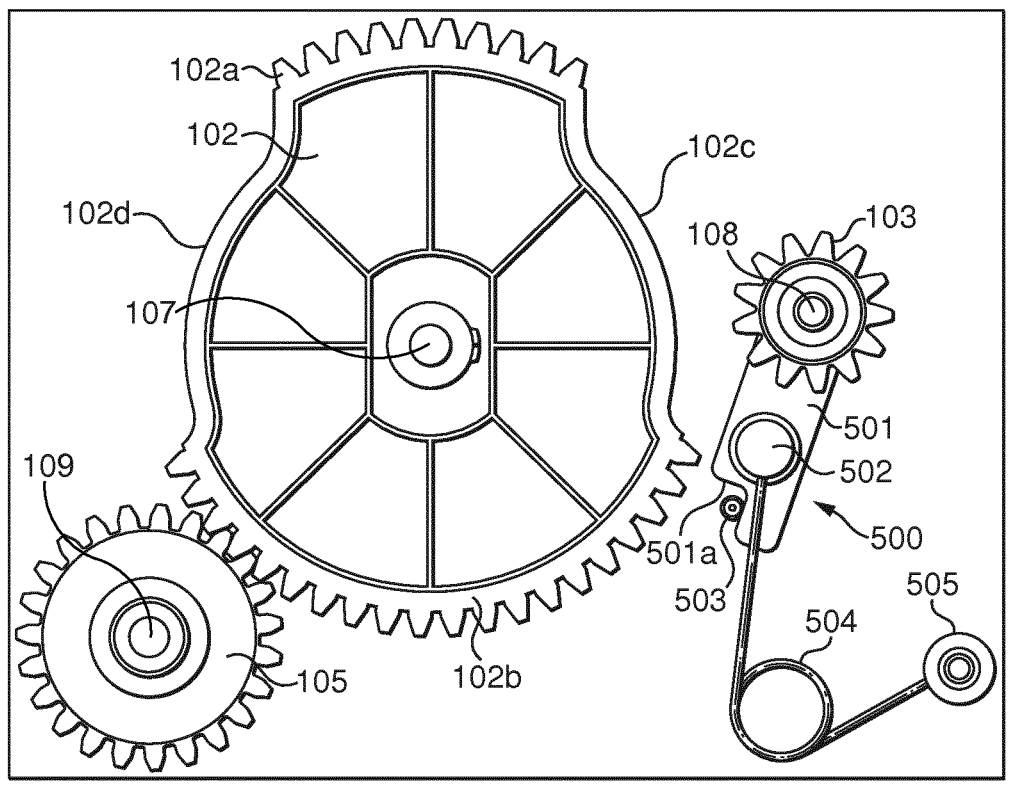
FIG. 5a is a schematic diagram of a gear locating system for use in the braking system of FIGS. 1a and 1b in a first configuration.
Figure 5B:
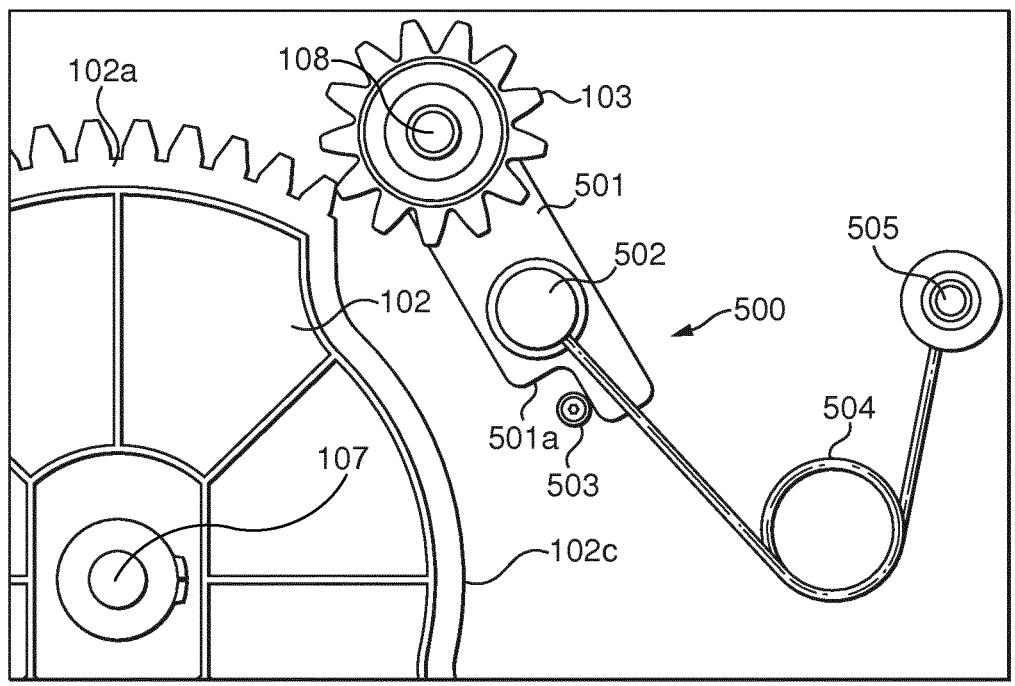
FIG. 5b is a schematic diagram of the gear locating system of FIG. 5a in a second configuration.
Figure 5C:
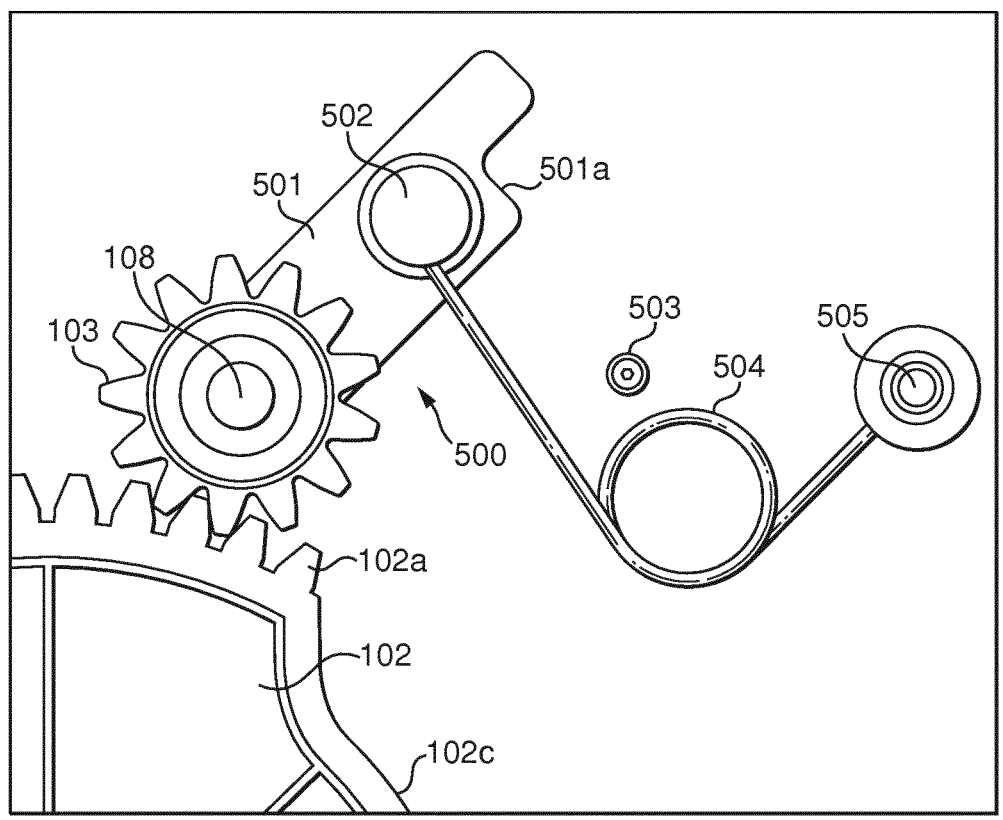
FIG. 5c is a schematic diagram of the gear locating system of FIG. 5a in a third configuration.

FIGS. 5a, 5b and 5c illustrate a gear locating system 500 according to an example. The gear locating system 500 enables the first gear wheel 103 to be fixed in a given stop position such that the teeth of the first gear wheel interlock with the teeth of the first toothed portion 102a when the first gear wheel engages with the first toothed portion 102a, for example, during the counter-clockwise rotation about the first axis 107 of the support structure 101 relative to the gear piece 102. That is, when the first gear wheel 103 is disengaged from the first toothed portion and is adjacent the toothless portion 102c, in this example, the first gear wheel 103 is held in a rotational stop position that allows the teeth of the first gear wheel 103 to interlock correctly with the teeth of the first toothed portion 102a when the first gear wheel 103 begins to engage with the first toothed portion 102a.

In this example, a moveable arm 501 is attached to the first gear wheel 103 so that the moveable arm 501 rotates about the second axis 108 concurrently with the first gear wheel 103. That is, for a given number of degrees of rotation about the second axis 108 of the first gear wheel 103, the arm 501 rotates the same given number of degrees about the second axis 108. A first connected 502 is rotatably connected to the arm 501. That is, the first connector 502 is connected to the arm 501 such that it can rotate relative to the arm 501. In this particular example, the first connector 501 is fixed to an arm of a torsional spring 504. A second arm of the spring 504, in this example, is fixed to second connector 505, which is fixed to the support structure 101. The first and second connectors 502, 505, and the torsional spring 504 thus form an example of a biasing mechanism. This biasing mechanism is fixedly connected to the support structure 101 via the second connector 505. Since the support structure 101 is fixedly connected to the holder structure 205, the biasing mechanism is fixedly connected to the holder structure 205. Further in this example, the arm 501 is pivotably connected to the biasing mechanism via the first connector 502.

In this example, the braking system 100 comprises a stop mechanism which defines the stop position of the arm 501, and thereby the rotational stop position of the first gear wheel 103. In this example, the stop mechanism comprises a stopping pin 503 and a recess 501a in the arm 501. In this example, the stop position is the position in which a surface of the recess 501a rests against the pin 503 as shown in FIG. 5a. The biasing mechanism, through the action of the spring 504, biases the arm 501 in the stop position when the first gear wheel 103 is disengaged from the first toothed portion 102a by biasing the arm 501 towards the pin 503.

As it will be understood, when the support structure 101 rotates in a counter-clockwise direction relative to the gear piece 102, at a point during this rotation, the first gear wheel 103 will engage with the first toothed portion 102a. As described above, the stop position of the gear wheel 103 allows its teeth to interlock correctly with the teeth of the first toothed portion 102a when this point of the counter-clockwise rotation (of the support structure 101 relative to the gear piece 102) is reached. FIG. 5b illustrates the first gear wheel 103 engaging thusly with the first toothed portion 102a during the counter-clockwise rotation.

FIG. 5c illustrates the first gear wheel 103 continuing to roll along the first toothed portion 102a with the counter-clockwise rotation of the support structure 101. The first gear wheel 103 may be allowed to roll along a given length of the first toothed portion 102a based on the lengths of the arms of the spring 504. The components of the biasing mechanism can be selected so as to allow the first gear wheel 103 to roll along different lengths of the first toothed portion 102a.

The gear locating system 500 in the example of FIGS. 5a to 5c inhibits the teeth of the first gear wheel 103 from sliding against the teeth of the first toothed portion 102a in such a way that causes damage to the teeth of the gear wheel 103 or the toothed portion 102a due to friction when the gear wheel 103 engages with the toothed portion 102a.

During a clockwise rotation of the support structure 101 relative to the gear piece 102, when the first gear wheel 103 disengages from the first toothed portion 102a, the biasing mechanism ensures a return of the arm 501, and thereby the gear wheel 103, to the stop position due to the action of the spring 504.

The above arrangements are to be understood as illustrative examples. Further arrangements and modifications to those arrangements are envisaged. For example, although in the above examples, the holder structure 205 of the holder system 200 was described as being caused to pivot between the first and second configurations by manual manipulation, in some examples an electric or other motor may cause the pivoting.

Although in the above examples, the gear engagement mechanism 102 is a single gear piece having first and second engagement portions 102a, 102b, other examples are possible. For example, the first and second engagement portions 102a, 102b may be on distinct gear pieces. For example, the engagement portions may be located so that one or more of the gear wheels 103, 105 rotate in a direction opposition to a direction of rotation of the support structure 101.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A braking system comprising:
   a support structure pivotable about a first axis;
   a gear engagement mechanism fixed with respect to the first axis and having a first toothed portion and a second toothed portion;
   a first gear wheel connected to the support structure, and rotatable about a second axis, the first gear wheel being toothed to engage with the first toothed portion, and being connected to a first damping mechanism to damp pivoting of the support structure in a first direction when the first gear wheel is engaged with the first toothed portion; and
   a second gear wheel connected to the support structure, and rotatable about a third axis, the second gear wheel being toothed to engage with the second toothed portion, and being connected to a second damping mechanism to damp pivoting of the support structure in a second direction when the second gear wheel is engaged with the second toothed portion.

2. The braking system according to claim 1, wherein the support structure is connected to a print target holder system.

3. The braking system according to claim 1, wherein the first and second damping mechanisms are one-directional damping mechanisms.

4. The braking system according to claim 1, wherein in a first configuration the first gear wheel is engaged with the first toothed portion, and in a second configuration the first gear wheel is disengaged from the first toothed portion and the second gear wheel is engaged with the second toothed portion.

5. The braking system according to claim 4, comprising:
   a movable arm attached to the first gear wheel so that the moveable arm rotates about the second axis concurrently with the first gear wheel;

a biasing mechanism fixedly connected to the support structure, the movable arm being pivotably connected to the biasing mechanism; and a stop mechanism defining a stop position of the moveable arm, the biasing mechanism to bias the moveable arm towards the stop position when the first gear wheel is disengaged from the first toothed portion.

6. The braking system according to claim 5, wherein the stop position is such that teeth of the first gear wheel interlock with teeth of the first toothed portion when the first gear wheel engages with the first toothed portion.

7. The braking system according to claim 1, wherein a gear ratio between the first gear wheel and the first toothed portion is different than a gear ratio between the second gear wheel and the second toothed portion.

8. A print target holder system, comprising:
a connection mechanism to connect the holder system to a printer;
a print target holder structure pivotably connected to the connection mechanism to pivot between a first configuration and a second configuration;
a brake system comprising:
first and second engagement portions fixed with respect to the connection mechanism;
a first gear wheel rotatably connected to the print target holder structure, the first gear wheel being engageable with the first engagement portion, and connected to a first braking mechanism to provide a braking force to inhibit movement towards the first configuration; and
a second gear wheel rotatably connected to the support structure, the second gear wheel being engageable with the second engagement portion, and connected to a second braking mechanism to provide a braking force to inhibit movement towards the second configuration.

9. The print target holder system according to claim 8, wherein the print target holder structure comprises a first print target holder and a second print target holder that each pivot concurrently with the print target holder structure.

10. The print target holder system according to claim 8, wherein in the first configuration the first gear wheel is engaged with the first engagement portion, and in a second configuration the first gear wheel is disengaged from the first engagement portion.

11. The print target holder system according to claim 10, wherein the first engagement portion comprises a first toothed portion, the first gear wheel is toothed so as to interlock with the first toothed portion, and the brake system comprises:
a moveable arm attached to the first gear wheel so that the moveable arm rotates concurrently with the first gear wheel;
a biasing mechanism connected to the print target holder structure, the moveable arm being pivotably connected to the biasing mechanism; and
a stop mechanism defining a stop position of the moveable arm, the biasing mechanism biasing the moveable arm towards the stop position when the first gear wheel is disengaged from the first toothed portion.

12. The print target holder system according to claim 8, comprising a releasable lever mechanism to hold the braking system in the first configuration.

13. The print target holder system according to claim 8, wherein the first braking mechanism is biased so as not to provide a braking force to inhibit movement towards the second configuration, and the second braking mechanism is biased so as not to provide a braking force to inhibit movement towards the first configuration.

14. A printer system, comprising:
a printer;
a gear engagement mechanism fixed with respect to the printer; and
a print target holder system pivotably connected to the printer to pivot between first and second configurations, comprising:
a first gear mechanism to selectively engage with the gear engagement mechanism such that the first gear mechanism is engaged in the first configuration and disengaged in the second configuration, and to provide a damping force, when engaged, against pivoting from the second configuration to the first configuration;
a second gear mechanism to engage with the gear engagement mechanism and provide a damping force against pivoting from the first configuration to the second configuration.

15. A printer system according to claim 14, wherein the second gear mechanism is engaged with the gear engagement mechanism throughout pivoting from the first configuration to the second configuration.

* * * * *